United States Patent [19]

Jurneke

[11] Patent Number: 5,343,337
[45] Date of Patent: Aug. 30, 1994

[54] CONTROL CIRCUITRY FOR MAGNETORESISTIVE (MR) TAPE HEADS USING GROUP SELECT SWITCHES AND HEAD SELECT MULTIPLEXER

[75] Inventor: Joe K. Jurneke, Brighton, Colo.

[73] Assignee: Digital Equipment Corporation, Maynard, Mass.

[21] Appl. No.: 947,029

[22] Filed: Sep. 17, 1992

[51] Int. Cl.⁵ ............................................. G11B 15/12
[52] U.S. Cl. ..................................................... 360/63
[58] Field of Search ...................... 360/63, 61, 66, 113, 360/38.1, 46, 48, 49, 51, 60; 358/213

[56] References Cited

U.S. PATENT DOCUMENTS

| | | | |
|---|---|---|---|
| 3,848,262 | 11/1974 | Belcastro | 360/60 |
| 4,044,387 | 8/1977 | Watkins et al. | 360/63 |
| 4,063,293 | 12/1977 | Perahia | 360/63 |
| 4,321,632 | 3/1982 | Leis et al. | 360/49 |
| 4,356,520 | 10/1982 | Yanagida | 360/63 |
| 4,453,187 | 6/1984 | Komma et al. | 358/213 |
| 4,584,616 | 4/1986 | Allen | 360/48 |
| 4,816,932 | 3/1989 | Yates | 360/46 |
| 4,851,932 | 7/1989 | Scheer et al. | 360/51 |
| 4,953,161 | 8/1990 | Toyama | 360/63 |
| 5,083,225 | 1/1992 | Morisaki et al. | 360/64 |
| 5,245,482 | 9/1993 | Sagawa et al. | 360/64 X |

*Primary Examiner*—Donald Hajec
*Assistant Examiner*—Patrick Wamsley
*Attorney, Agent, or Firm*—Krishnendu Gupta; Ronald C. Hudgens; Albert P. Cefalo

[57] ABSTRACT

Circuitry is provided that interconnects a plurality of MR heads on a substrate with control circuitry using a lesser number of interconnecting paths. This reduces the number of required substrate pins to which the interconnecting paths are connected. The reduced number of substrate pins is such that it enables manufacturing and processing techniques to accommodate an increased number of MR heads on a given substrate over that which would be possible with the prior art interconnecting techniques.

6 Claims, 4 Drawing Sheets

CONTROL CIRCUITRY FOR MAGNETORESISTIVE (MR) TAPE HEADS USING GROUP SELECT SWITCHES AND HEAD SELECT MULTIPLEXER

FIELD OF THE INVENTION

This invention relates to control circuitry for magnetoresistive (MR) heads and, more particularly, to control circuitry which reduces the number of interconnections between a plurality of MR heads and the circuitry which controls the operation of these plurality of MR heads.

DESCRIPTION OF THE RELATED ARTS

Magnetic devices, such as magnetic tapes, are typically multi track devices on which information is stored on a multitude of tracks of the devices, hereinafter tapes. Tapes are typically read on one or more track(s) at a time by a head unique to each track(s). The system of which the tape head are a part specifies the head and track that is to be activated on a given read operation to read the information recorded on the associated track(s).

In order to perform the function of enabling data on a selected track to be read, the interconnections between the read heads and the controlling circuitry must enable the data read by the head associated with the selected track(s) to be applied to the control circuitry. This is typically accomplished by interconnections provided on a one-for-one basis between the heads and the control circuitry so that each read head is connected by a separate set of conductors to the control circuitry.

This arrangement is satisfactory for applications in which the number of read heads is relatively small as well as in applications in which the size of the read head apparatus is not a consideration and may be as large as required to accommodate the plurality of read heads as well as the required interconnections between the read heads and the control circuitry.

However, due to continuing advances in the magnetic recording art, space and size is often at a premium and it is sometimes difficult, if not impossible, to interconnect a large number of read heads with control circuitry using a unique set of conductors for each read head. There are a number of reasons for this. First of all, read heads of the MR (magneto resistive) type are manufactured using thin film techniques wherein the physical size of each head is extremely small. Also, center tapped MR heads require three connections per head for their operation with one connection being a center tap between two MR elements of the MR head and with two additional connections being required for the two MR elements of the MR head. Another factor is that continuing advancements in thin film techniques and the magnetic recording art permit an ever increasing number of tracks and associated tape heads to be accommodated for a tape of a given width, such as 0.5 inches. At the current time, 18 tracks and 18 associated heads are commonplace as is 36 tracks and 36 associated heads. The trend is toward an increasing number of tracks, such as 72. This will require that 72 MR heads be interconnected with associated control circuitry. A 72 track MR head embodiment would require 3×72 or 216 interconnections between the 72 MR heads and the associated control circuitry. With thin film technology, 72 MR heads can be accommodated on a substrate that is three-quarters of an inch (¾") at the portion of the substrate containing the interconnecting pins to which the control circuitry is connected. This would require that the ¾" portion of the substrate accommodate 216 pins if the interconnections were provided on a one-for-one basis wherein each MR head has its own unique set of three conductors that must be connected to the control circuitry. It would be difficult, if not impossible, to accommodate 216 pins on a ¾" section of substrate.

The number of interconnections and substrate pins required can sometimes be reduced somewhat by grouping the MR heads say, for example, into groups of 18 heads each with the center tap of all heads of a group being connected together on the substrate and a single substrate pin being used to connect the center tap of all 18 MR heads of the group with the control circuitry. However, even with the use of a common center tap connection per group, the number of separate connections required for a 72-head application are relatively large. Specifically, the number of conductors required are two times the number of heads plus one center tap conductor per group. Thus for a 72-head application, the number of separate conductors and substrate pins required would be 2×72 or 144 plus 4 center tap conductors for an embodiment in which the 72 heads are divided into 4 groups of 18 heads each.

From the above, it can be seen that it is a problem to connect a large number of MR heads mounted on a substrate with the associated control circuitry where the heads and interconnections and pins are provided on a one-for-one basis for each MR head.

SUMMARY OF THE INVENTION

The present invention solves the above-discussed problems and achieves an advance in the art by providing an arrangement wherein a plurality of MR heads may be interconnected with control circuitry by a lesser number of conductors than heretofore required. In accordance with one possible preferred exemplary embodiment of the invention, a plurality of MR heads are connected to control circuitry by a single pair of signal conductors common to all MR heads plus a center tap control conductor unique to each MR head. Thus, a group of 18 MR heads may be connected to a control circuit by a single pair of signal conductors common to all 18 heads plus a center tap conductor unique to each of the 18 heads. This results in 18 heads being connected to the control circuit by 20 conductors.

An MR head is operative to read data from an associated track of a magnetic tape only when a bias current is caused to flow through the two signal elements of the MR head. In accordance with the first possible preferred embodiment of the invention wherein the signal elements of all MR heads are connected in parallel to the control circuit, a selected one of the MR heads is activated by connecting the center tap of the selected head to ground. This enables a bias current to flow from the control circuit over the single pair of signal conductors common to a group of MR heads, through only the signal elements of the selected MR head, to the center tap of the MR head, and then to ground through a closed switch associated with the selected MR head. Bias current flows only through the selected MR head so that only this MR head is effective to read the data from its associated track of the magnetic tape. The data read by the selected MR head appears on its signal elements which are connected in parallel with the signal elements of all other MR heads and, in turn, are connected to the control circuit that provides the bias over the single pair of signal conductors common to all of the MR heads. By this means, only the MR head associated with the selected track that is to be read is activated with a bias current so that only it reads the data from its associated track and applies it over the common signal conductors to the control circuit. The other heads of the group are not activated with bias current at this time and, therefore, they do not now read the data contained from their associated tracks.

In accordance with a second possible preferred exemplary embodiment, a plurality of recording heads, say for example 72, are subdivided into four groups of 18 MR heads each with the MR signal elements of the MR heads (1, 2, 3, 4, 5, etc.), within each group being connected in parallel to the signal elements of the corresponding heads (1, 2, 3, 4, 5, etc.), in each other group. In an embodiment in which there are 18 MR heads per group, the 18 different heads of a first group are connected in parallel to the corresponding heads of each other group and, in turn, over a unique set of signal conductors and via a multiplexer to a bias current source in a control circuit. The center tap terminals of the MR heads of a group are connected to each other and, in turn, to a switch unique to the group. This switch may be controllably activated to cause bias current to flow only through signal elements of a selected MR head of a selected group.

In order to read data from a selected track, the MR head associated with the selected track, say the first head of the first group, is activated by closing the control switch that extends to the center tap of the signal elements of all MR heads of the first group. The multiplexer is operated to connect the signal elements of the selected MR head of the first group with a source of bias current. This causes bias current to flow through the signal elements of the selected MR head. The multiplexer is activated so that only its input associated with the first track is activated to extend bias current to the selected MR head so that only the data read by the selected MR head is applied to a data receiver.

The use of the above circuitry of the invention greatly reduces the nun%her of interconnections and substrate terminals required to interconnect a large number of MR heads with an associated control circuit so that data read only by a selected head may be applied by the control circuit to a data receiver.

The present invention therefore provides the advantage that it significantly reduces the number of interconnections and substrate pins required to connect a plurality of read heads with an associated control circuit.

BRIEF DESCRIPTION OF THE DRAWING

The above and other advantages and features of the invention may be better understood from a reading of the following detailed description of one possible exemplary embodiment thereof taken in conjunction with the drawing in which:

FIG. 4 is positioned to the right of FIG. 3, disclose the details of a second possible preferred exemplary embodiment of the invention.

DETAILED DESCRIPTION

Figure 1:
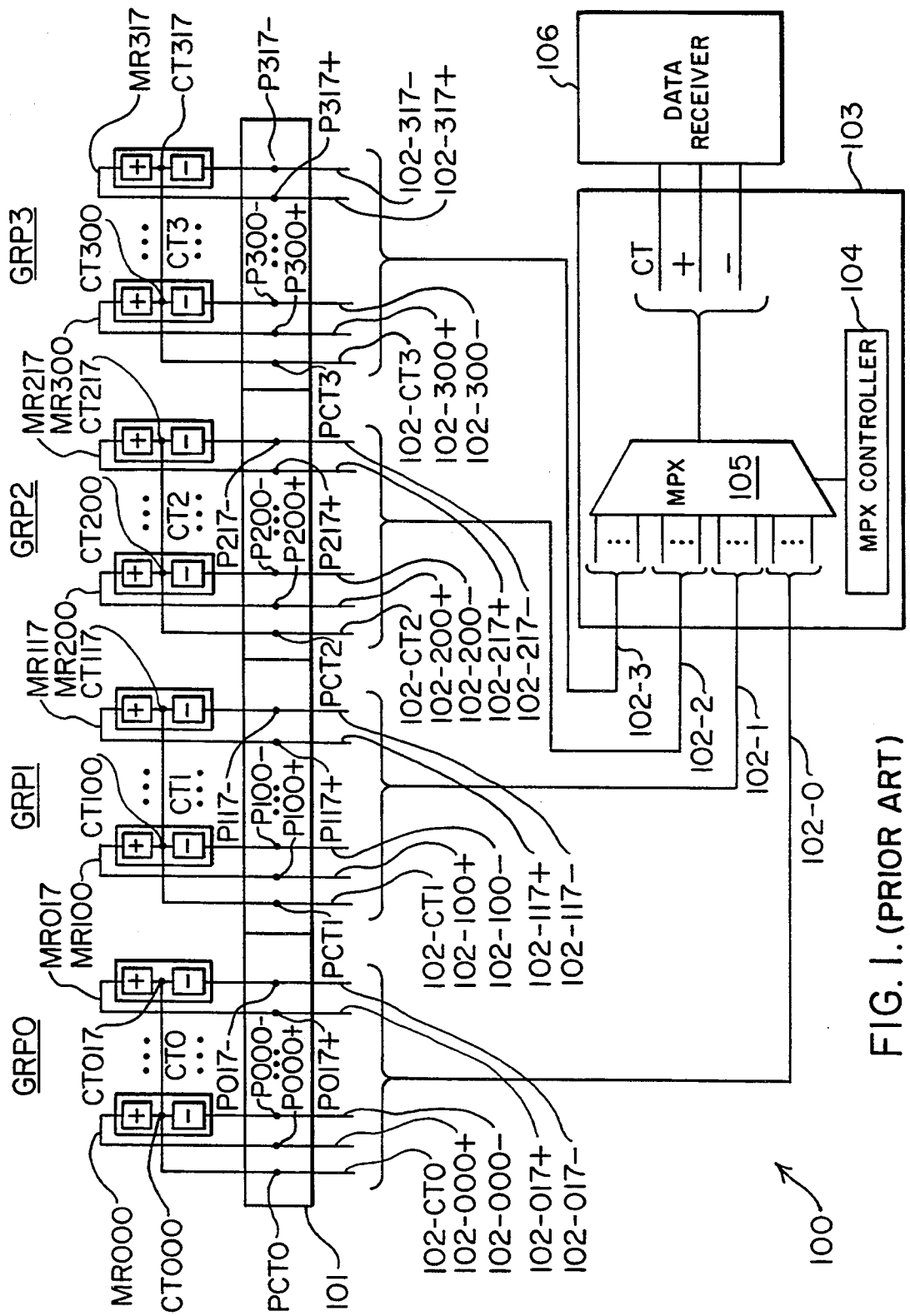
FIG. 1 discloses a prior art arrangement used to interconnect a plurality of MR heads with a control circuit.

Description of FIG. 1

FIG. 1 discloses how a plurality of MR read heads are connected to a control circuit by a prior arrangement. FIG. 1 discloses 72 MR heads subdivided into four groups of 18 heads each. The groups are designated GRP 0 through GRP 3 and the heads within each group have a numerical suffix of 00 through 17. The 18 heads of group 0 are designated as MR 000 through MR 017 and the 18 heads of group 3 are designated MR 300 through MR 317. Each MR head has a plus (+) and a minus (−) signal elements which are connected to a center tap (CT-) terminal such as CT 000 for head 00 of group 0. Each MR head requires three connections to a substrate 101 having three pins unique to each MR head. Thus, pin PCT 0 connects to the center tap (CT-) terminals of all of MR heads of group 0. Pin P000+ connects to the upper portion of the + element of head MR 000 while pin P000− connects to the (−) element of MR head 000. Each pin on substrate 101 connects to a unique conductor 102-which extends to control circuit 103 and, in turn, to the inputs of a multiplexer 105. The conductor 102-that extends from the substrate associated with the 18 MR heads of group 0 are included in the conductor group 102-0 and extend to the lower input of multiplexer 105. In a similar manner, the conductors associated with the MR heads and associated substrate pins of MR head groups 1, 2, and 3 are contained, respectively, within the conductor groups 102-1, 102-2, and 102-3 extending to the other inputs of multiplexer 105.

MPX Controller 104 controls the operative position of multiplexer 105 so that only one of its inputs is connected at a time to its output conductors (CT, 0+, 0−, ) which extend to data receiver 106.

A particular MR head of a particular group is activated when multiplexer 105 is operated by controller 104 to extend the CT- conductor and the conductors of the selected MR head within the 102-conductors from the group containing the selected MR head. This connects this CT- conductor and the + and − conductors of the selected head conductors to the output conductors of the multiplexer extending to data receiver 106. At that time, circuitry within data receiver 106 applies a first potential, via the multiplexer, to the center tap terminal common to the selected group and then applies a bias potential to both signal elements of the selected MR head. Thus, for example, if head 0 of group 0 (MR 000) is to be selected, multiplexer 105 is operated to interconnect conductors 102-CT0, 102-000+ and 102-000− of conductor group 102-0 with its output conductors extending to data receiver 106. This connects data receiver 106 with the three conductors of MR head MR 000 of group 0. Data receiver 106 then activates the 0 head of group 0 by applying a first potential to the CT path from the output of multiplexer 105. This CT path is connected via the multiplexer, conductor group 102-0, conductor 102-CT0, and substrate pin PCT0 to the center tap of the 0 head of group 0. At the same time, data receiver 106 applies a bias potential to conductor 0+ and 0− which extend through multiplexer 105 and conductor group 102-0 to the conductors 102-000+ and 102-000−. These conductors are connected to substrate pins P000+ and P000− which, in turn, are connected to the + and − signal elements of MR head 0 of the 0 group. These connections cause bias current to flow only through the signal elements of selected head MR000 so that only it responds to read the data from its associated track of the magnetic tape.

The embodiment of FIG. 1 works in a satisfactory manner in applications where space considerations are not a problem. The embodiment of FIG. 1 requires a center tap substrate terminal, such as PCT0, for each group of MR heads as well as two separate substrate terminals for each MR head. For the configuration of FIG. 1 which has 72 heads in four groups, four separate center tap substrate terminals are required together with two signal substrate terminals for each MR head for a total of two times 72 or 144 terminals. This results in a requirement for 172 plus 4, or 176 pins on substrate 101. This is an excessively high number of pins that cannot be easily accommodated on a substrate section having a height of no more than ¾".

Thus, it can be seen that the wiring and interconnection techniques used to connect MR heads with controller elements using prior art arrangements are unsuitable for use in applications having a large number of MR heads.

Figure 2:
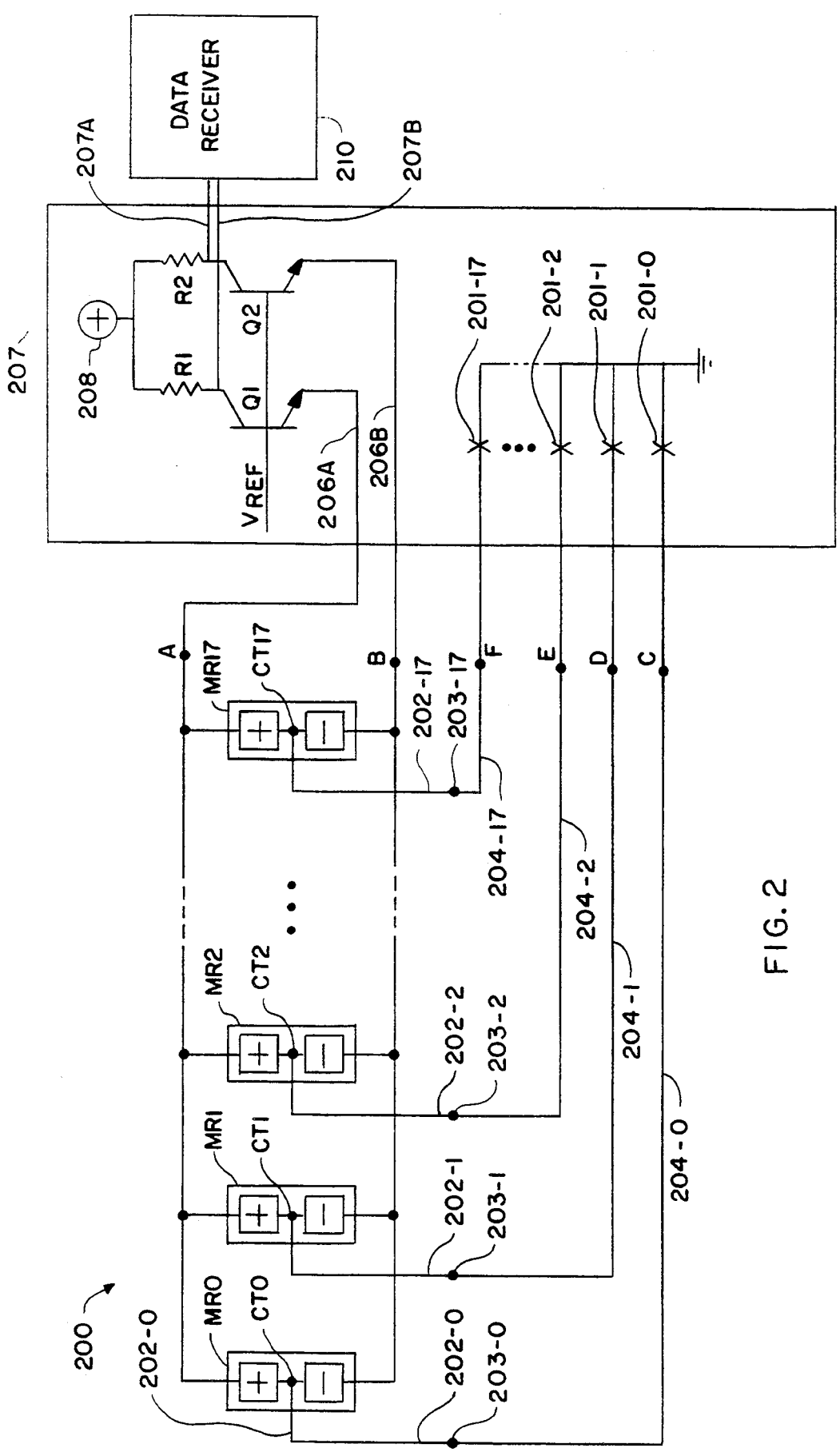
FIG. 2 discloses the details of a first possible preferred exemplary embodiment of the invention.

Description of FIG. 2

FIG. 2 discloses a first possible preferred exemplary embodiment of the invention wherein a plurality of MR heads, MR0 through MR17, are connected by a lesser number of conductors to a controller 207 which performs the dual function of providing a bias current to a selected MR head as well as receiving the data signals read by the selected head. On FIG. 2, the top of the + signal elements of each MR head are connected in parallel to each other and, in turn, to the A signal terminal on the substrate containing the MR heads. Similarly, the bottom of the (−) signal elements of each MR head are connected together and, in turn, to the B signal terminal of the substrate containing the MR heads. The center tap of each MR head, such as CT0 for head MR0, are connected to a different one of the terminals 203-0–203-17 of the substrate containing the MR heads.

Signal terminals A and B of the substrate are connected via conductors 206A and 206B to controller 207 where they are connected to the emitters of transistors Q1 and Q2. Terminals 203- are connected over a separate one of the conductors 204-0 through 204-17 to contacts of switches 201-0 through 201-17 within controller 207. The common side of switches 201 are connected to ground.

None of the MR heads is activated with a bias current when all of switches 201 are open. To activate a selected head so that it can read data from its associated track of the tape, the switch 201-associated with the selected head is closed. Let it be assumed that it is desired to activate head MR0. In this case, switch 201-0 is closed to apply a ground via path 204-0 to the center tap CT0 of head MR0. This grounding of the center tap of head MR0 permits a bias current to flow from the positive potential 208 within element 207, through resistors R1 and R2, through transistors Q1 and Q2 and over conductors 206A and 206B to terminals A and B. This current flows from terminal A, through the + signal element of head MR0, to center tap CT0 which is now grounded. This current also flows from terminal B, through the (−) element of MR head MR0, to the ground at the center tap CT0 of head MR0. This bias current flowing through both signal elements of head MR0 permits the head to read the data on its associated track of the tape. The data signals read by the signal elements of head MR0 are applied to terminals A and B of the substrate and from there over conductors 206-A and 206-B to the emitters of transistors Q1 and Q2. These signals are amplified by transistors Q1 and Q2 across resistors R1 and R2 and applied over output conductors 207A and 207B to a data receiver circuit. Heads MR1 through MR17 are not activated with bias current at this time since their associated switches 201-1 through 201-17 are not closed to ground their center taps. Therefore, these heads do not respond to the data on their associated tracks of the tape when the track associated with MR0 is read.

The circuitry disclosed in FIG. 2 permits a plurality of MR heads to be selectively interconnected with an associated controller by a lesser number of conductors than is the case for the prior art interconnecting arrangement of FIG. 1. Specifically, the arrangement of FIG. 1 requires a separate pair of signal conductors for each MR head and a similar number of pins on the substrate containing these MR heads. Alternatively, the interconnecting circuitry of FIG. 2 requires only a single set of terminals, A and B, for all of the MR heads on the substrate. The arrangement of FIG. 2 also requires a separate terminal extending to the center tap of each MR head. However, for a group of 18 heads, the arrangement of FIG. 2 requires only 18 center tap pins plus two signal pins for a total of 20 pins on the substrate. By way of distinction, the arrangement shown on FIG. 1 of the prior art requires 2 times 18, or 36 signal pins plus a center tap pin for a total of 37 pins on the substrate to accommodate a group of 18 MR heads. Thus, for a group 18 MR heads, the arrangement of FIG. 2 the number of pins required over the prior art from 37 to 20.

Figure 3:
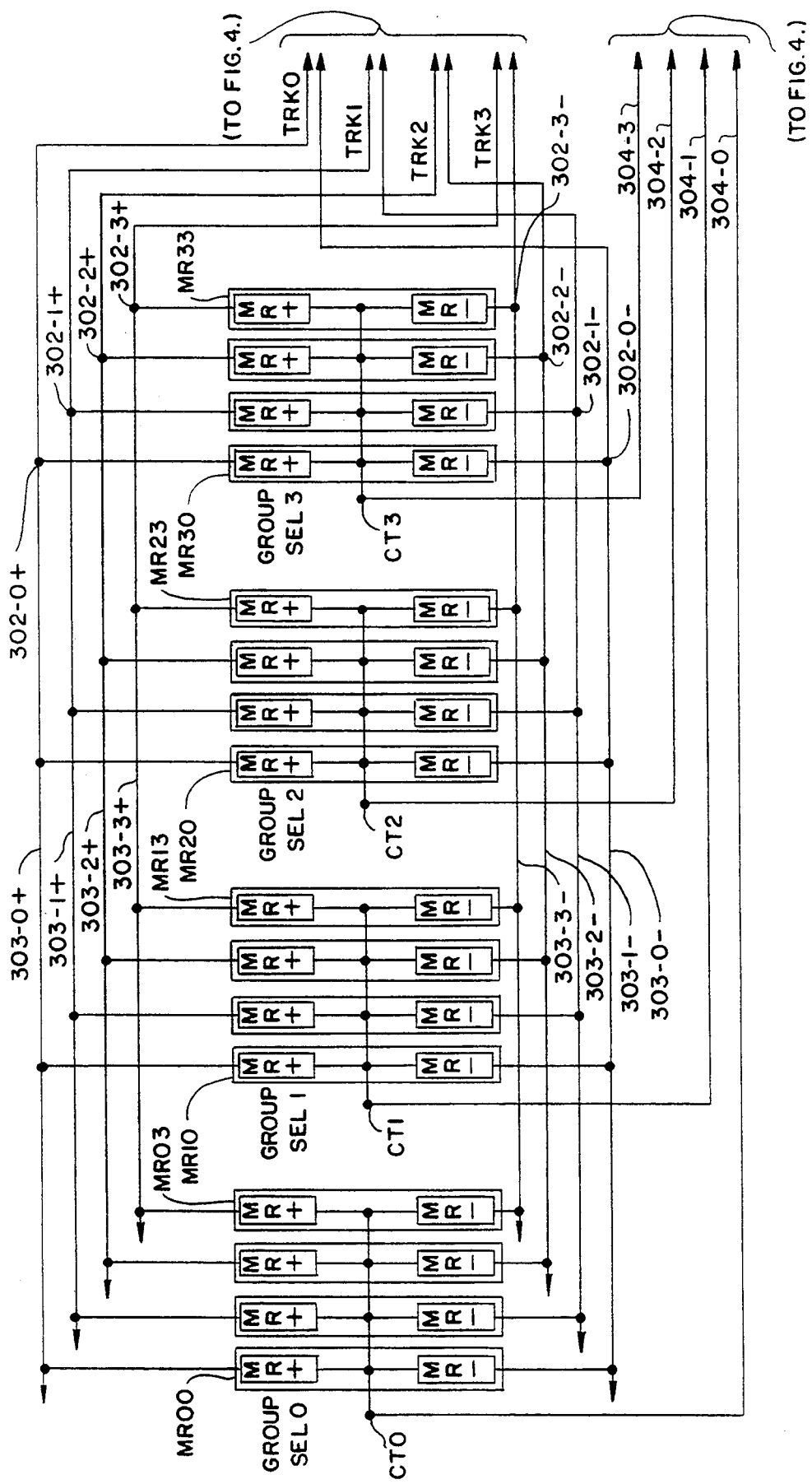
FIGS. 3 and 4, when

Description of FIG. 3

FIG. 3 discloses another possible preferred exemplary embodiment of the invention wherein a plurality of MR heads are interconnected with a controller that selects the MR head that is to be active on a given read operation and that receives the data read by the selected head. FIG. 3 discloses four groups of four heads each with the four groups being designated as group 0 through 3. The MR heads of group 0 are designated MR00 through MR03 with the heads of the next group being designated MR10 through MR13, the heads of the next group being designated MR20 through MR23, and with the heads of the fourth group being designated MR30 through MR33. Each MR head comprises a plus and a minus or terminal which are connected in series. The center tap of each pair of MR head elements is connected to a center tap terminal common to the group. Thus, MR heads 00 through 03 of group 0 have their center taps connected to a common center tap terminal CT0. The outer end of the + signal terminal or element of each MR head of a group is connected to the outer end of the + signal terminal or element of a corresponding head of each other group and, in turn, to a common substrate terminal. Thus, the outer end of the + signal terminal or element of head 0 of group 0 (MR00) is connected to the corresponding signal terminal or element on head 0 of every other group (MR10, 20, and 30) and, in turn, to a common substrate terminal 302-0+. This connection is made via conductor 303-0+. In a similar manner, the outer end of the − signal terminal or element of each MR head of a group is connected to a corresponding head in every other group and, in turn, to a common substrate terminal.

Thus, the − signal terminal or element of head 0 of group 0 (MR00) is connected over path 303-0− to the − signal terminal or element of head 0 of every other group and, in turn, to substrate terminal 302-0−. The + and − signal terminal or elements of the other MR heads of FIG. 3 are connected in a similar manner to a pair of signal terminals. Common substrate terminals 302-1+ and 302-1− are connected to the signal elements of head 1 of each group, common substrate terminals 302-2+ and 302-2− are connected to the signal elements of head 2 of each group and common substrate terminals 302-3+ and 302-3− are connected to the signal elements of head 3 of each of the four groups. Common substrate terminal 302-0+ and 0− always receive track 0 information with the specific track 0 information received being dependent upon the group that is active on a given read operation. Similarly, the other 302-common substrate terminals receive the data for tracks 1, 2, and 3 depending upon which head of which group is active.

Figure 4:
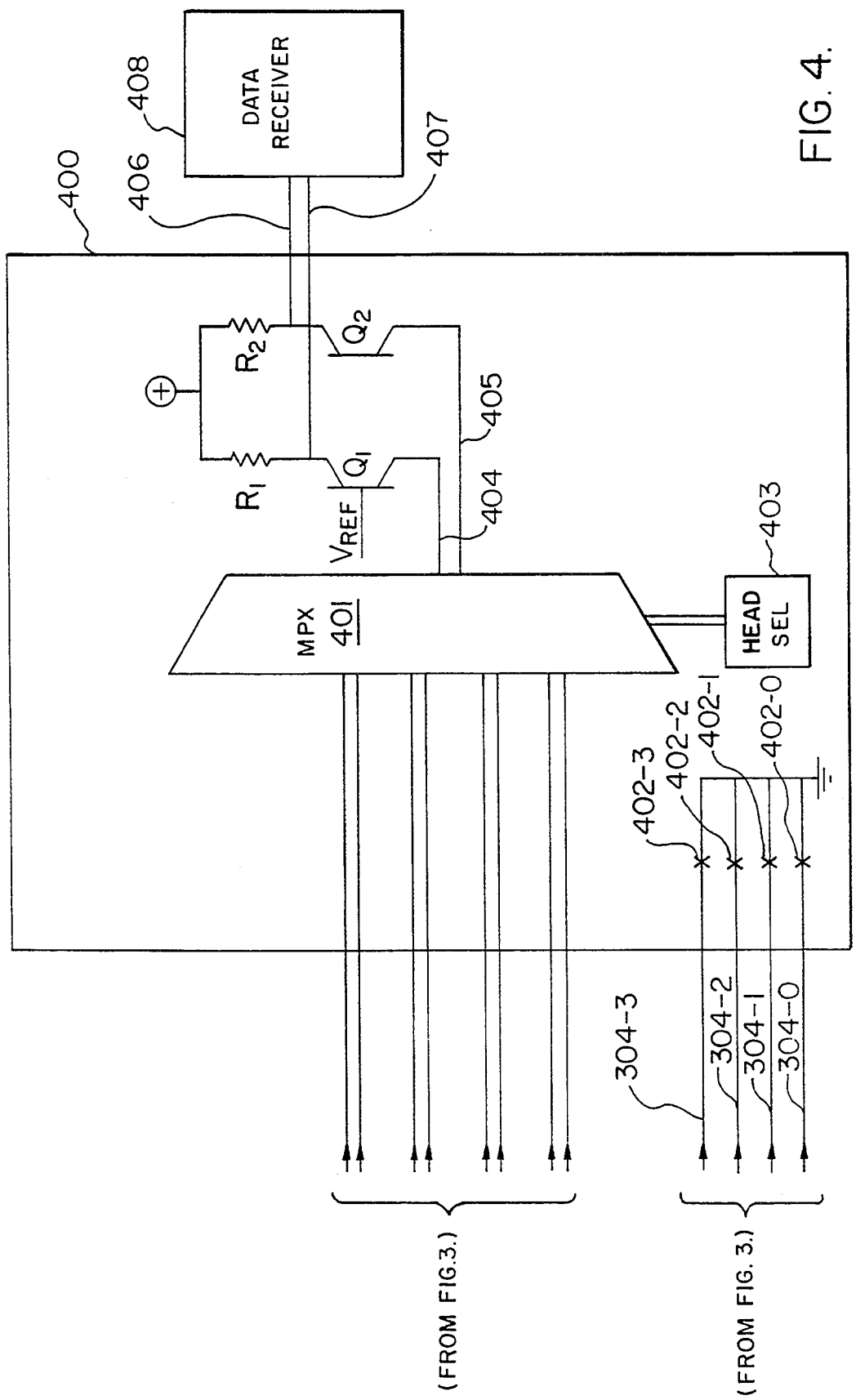

The substrate center tap terminals CT0 through CT3 are connected over the respective ones of conductors 304-0 through 304-3 to group select switches 402-0 through 402-3 within controller 400 of FIG. 4. The other side of each of these group select switches is connected to ground.

The conductors interconnecting FIGS. 3 and 4 are designated track 0, track 1, track 2, track 3, and they interconnect the inputs of multiplexer 401 of controller 400 with the substrate 302- terminals of FIG. 3 associated with heads 0, 1, 2, and 3 of each of the four groups of MR heads. A selected MR head of a selected group is activated on a read operation when head/track selector 403 controls multiplexer 401 so that it interconnects its outputs 404 and 405 with the one of its inputs which is connected to the signal elements of the selected head. Output conductors 404 and 405 of the multiplexer extend to the emitters of transistors Q1 and Q2 respectively.

Let it be assumed, for example, that head 0 of group 0 is to be selected on a given read operation to read data from its associated track 0. In this case, head/track select element 403 controls multiplexer 401 so that it interconnects its upper left hand input with its output conductors 404 and 405. With this operation, the signal elements of head 0 of each group is connected via conductors 303-0+ and 303-0− to substrate terminals 302-0+ and 302-0− which, in turn, are connected via track 0 conductors to the upper left hand input of multiplexer 401. Multiplexer 401 extends this connection via paths 404 and 405 to the emitters of transistors Q1 and Q2. At this time, the positive potential common to resistors R1 and R2 connected to the collectors of transistors Q1 and Q2 is extended through the above described path to substrate terminals 302-0+ and 302-0− and from there over conductors 303-0+ and 303-0− to the signal elements of head 0 of each group. Since head 0 of only group 0 is to be selected, group select switch 402-0 is closed to extend ground via conductor 304-0 to the center tap substrate terminal CT0 common to the center tap of the signal elements of all heads of group 0. This connection permits the positive potential on conductors 303-0+ and 303-0− to cause a current to flow through the + and − signal elements of head MR00 via center tap terminal CT0, conductor 304-0, and switch 402-0 to ground. This bias current activates the signal elements of MR head 00 so that it, and only it, responds to the read operation to read the data on its associated track 0 of the tape.

The data signals read by head MR00 are extended over the same path that supplied the bias current to the emitters of transistors Q1 and Q2. This signal on the emitters of the transistors causes them to appear in amplified form across resistors R1 and R2 so that they are applied over conductors 406 and 407 to data receiver 408. At the end of this read operation, switch 402 may be opened to deactivate MR head 0 of group 0. At this time another head may be selected for the next read operation by closing the 402- switch associated with the group in which the next selected head is situated. The group head/track select element 403 now sends the appropriate signals to multiplexer 401 to switch it to the operative position required so that it interconnects its output conductor 405 with the one of its inputs that represents the track associated with the head that is selected for the next read operation.

t can be seen that the paths required to interconnect a substrate containing the 16 heads of FIG. 3 with the controller of FIG. 4 require a fewer number of substrate terminals to achieve the interconnection than does the interconnection arrangement of FIG. 1. Specifically, for a four-by-four configuration comprising four groups of four heads each, the prior art interconnecting arrangement of FIG. 1 would require the substrate containing the 16 MR heads to provide four center tap terminals (one for each of the four groups), together with eight signal terminals for each of the four groups for a total of 32 signal terminals plus four center tap terminals. This totals 36 substrate terminals in all. By way of comparison, the interconnection arrangement disclosed on FIGS. 3 and 4 requires only four center tap substrate terminals plus eight signal terminals for a total of 12 terminals in all. Thus, the present invention reduces the number of substrate terminals required from 36 of the prior art to 12.

As is shown on the attached Table I, the interconnection arrangement of the present invention provides similar reductions in the number of signal terminals required for other configurations. For example, for a configuration of four groups of 36 terminals each, the prior art arrangement requires 292 substrate terminals whereas the present invention requires only 76 substrate terminals.

TABLE I

| Groups | Heads Per Group | Prior Art Required Substrate Pins | Number of Substrate Pins Required by Present Invention |
|---|---|---|---|
| 4 | 4 | 36 | 12 |
| 4 | 8 | 68 | 20 |
| 4 | 18 | 148 | 40 |
| 2 | 18 | 74 | 38 |
| 2 | 36 | 146 | 74 |
| 4 | 36 | 292 | 76 |

It is therefore seen from the foregoing that the present invention drastically reduces the number of substrate terminals required to connect a plurality of heads with external circuitry. The reduction is such that a large number of heads may be interconnected via substrate pins with external circuitry in an application where the number of substrate pins required in accordance with the prior art interconnecting arrangement would have been impossible.

It is to be expressly understood that the claimed invention is not to be limited to the description of the preferred embodiment but encompasses other modifications and alterations within the scope and spirit of the inventive concept.

I claim:

1. Tape head apparatus comprising:

a plurality of magnetoresistive (MR) heads arranged into m groups of n MR heads, with each MR head being adapted to read data from an associated track of a magnetic tape;

a pair of series connected MR elements comprising each of said MR heads;

a first signal terminal and a second signal terminal and a center tap terminal on each pair of MR elements, said MR heads of each group being arranged to define a sequence of 1 . . . n MR heads where n is the number of MR heads per group;

n pairs of common substrate terminals each of which is associated with and connected to a different one of said MR heads in each of said groups of MR heads;

means for connecting a first terminal of each of said pairs of common substrate terminals to the first signal terminal of each MR head with which said pair of common substrate terminals is associated;

means for connecting a second terminal of each of said pairs of common substrate terminals to the second signal terminal of each MR head with which said pair of common substrate terminals is associated;

a plurality of group select switches each of which is associated with a different one of said groups of MR heads;

means for connecting each of said group select switches to the center taps of all MR elements of the group of MR heads with which said group select switch is associated; and a source of bias current;

a multiplexer controllably connectable to a selected one of said pairs of common substrate terminals for effecting a flow of current from said source of bias current through the pair of MR elements of a selected one of said MR heads of a selected group of MR heads when the one of said group select switches unique to said selected group of MR heads is operated;

said bias current through said MR elements of said selected MR head being effective to enable said MR elements of said selected MR head to read data from an associated track of said magnetic medium and apply signals representing said read data to said pair of common substrate terminals to which said selected MR head is connected.

2. The apparatus of claim 1 wherein said apparatus comprises:

a plurality of inputs on said multiplexer, each of said inputs being connected to a different single terminal of said pairs of common substrate terminals;

an output on said multiplexer;

a head selector on said multiplexer; and means for connecting said output to said source of bias current, said multiplexer being operable by said head selector to connect said multiplexer output to one of said multiplexer inputs at a time to enable the application of bias current to a selected MR head of a selected group of MR heads; said selected group of MR heads being selected when the one of said group select switches connected to the center taps of all MR elements of a group of MR heads and associated with a different one of said groups of MR heads is closed to selected a group.

3. The apparatus of claim 2 wherein said apparatus further comprises:

a data receiver;

said multiplexer being effective for receiving said data signals read by said selected MR head for extending said data signals to said data receiver.

4. A method of operating tape head apparatus comprising:

a plurality of magnetoresistive (MR) heads arranged into m groups of n MR heads, with each MR head being adapted to read data from an associated track of a magnetic tape;

a pair of series connected MR elements comprising each of said MR heads;

a first signal terminal and a second signal terminal and a center tap terminal on each pair of MR elements;

n pairs of common substrate terminals each of which is associated with and connected to a different one of said MR heads in each of said groups of MR heads;

said method comprising the steps of:

connecting a first terminal of each of said pairs of common substrate terminals to the first signal terminal of each MR head with which said pair of common substrate terminals is associated;

connecting a second terminal of each of said pairs of common substrate terminals to the second signal terminal of each MR head with which said pair of common substrate terminals is associated;

connecting a plurality of group select switches each of which is associated with a different one of said groups of MR heads to the center taps of all MR elements of the group of MR heads with which said group select switch is associated; and controllably applying through a multiplexer a source of bias current to a selected one of said pairs of common substrate terminals for effecting a flow of current through the pair of MR elements of a selected one of said MR heads of a selected group of MR heads when the one of said group select switches unique to said selected group of MR heads is operated;

said bias current through said MR elements of said selected MR head being effective to enable said MR elements of said selected MR head to read data from an associated track of said magnetic medium and apply signals representing said read data to said pair of common substrate terminals to which said selected MR head is connected.

5. The method of claim 4 wherein said method step of controllably applying a source of bias current further comprises the step of:

operating a multiplexer having a plurality of inputs each of which is connected to a different single terminal of said pairs of common substrate terminals;

said multiplexer having an output connected to said source of bias current; and said multiplexer having a head selector to connect said multiplexer output to one of said multiplexer inputs at a time to enable the application of bias current to a selected MR head of a selected group of MR heads; said selected group of MR heads being selected when the one of said group select switches connected to the center taps of all MR elements of a group of MR heads and associated with a different one of said groups of MR heads is closed to select a group.

6. The method of claim 5 wherein said method further comprises the step of:

operating said multiplexer or receiving said data signals read by said selected MR head for extending said data signals to said data receiver.

* * * * *